Feb. 26, 1929. 1,703,315

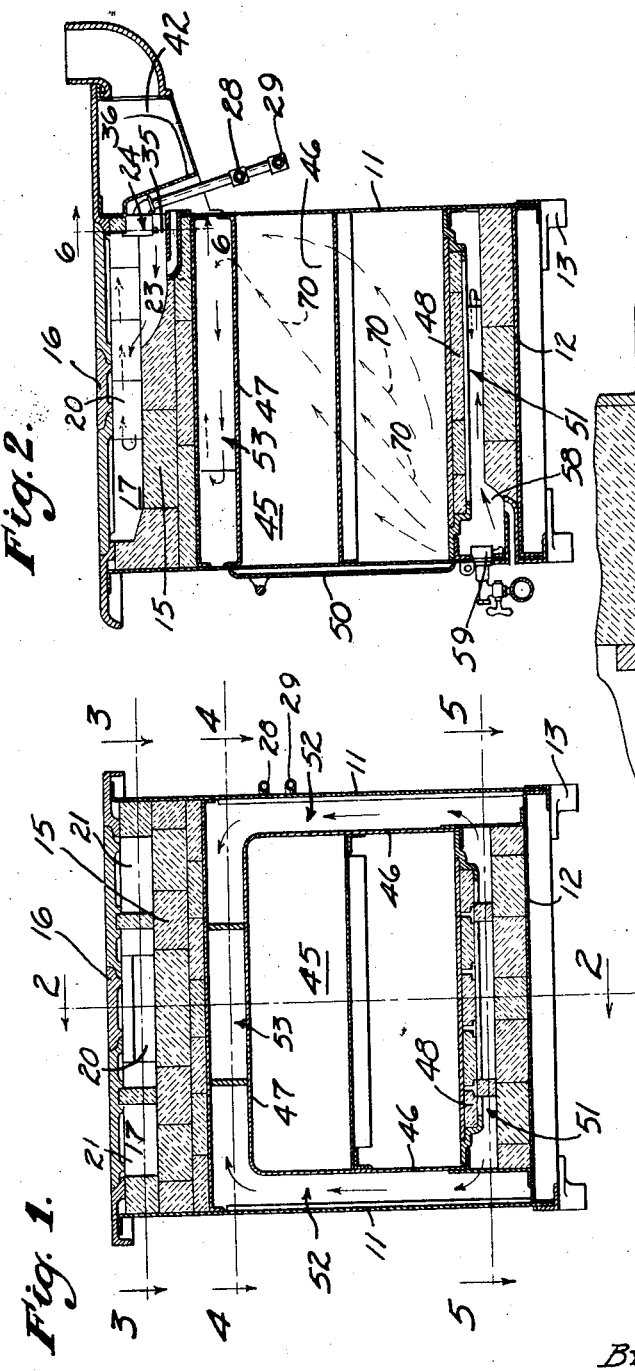

P. MADSEN

RANGE

Filed Dec. 14, 1926  2 Sheets-Sheet 2

INVENTOR:
PETER MADSEN,
BY Fad W Lauis
ATTORNEY.

Patented Feb. 26, 1929.

1,703,315

UNITED STATES PATENT OFFICE.

PETER MADSEN, OF LOS ANGELES, CALIFORNIA, ASSIGNOR TO MADSEN IRON WORKS, OF HUNTINGTON PARK, CALIFORNIA, A CORPORATION OF CALIFORNIA.

RANGE.

Application filed December 14, 1926. Serial No. 154,678.

My invention relates to gas ranges and has for its broad object to provide a range having an efficient distribution of heat.

It is a further object of the invention to provide a range in which the operating costs and the fuel consumption are low.

Other objects and advantages of the invention will be made evident hereinafter.

Referring to the drawings in which I illustrate a preferred form of the invention:

Fig. 1 is a vertical cross-section taken through a range embodying the features of my invention looking towards the back end thereof.

Fig. 2 is a section taken on the line 2—2 of Fig. 1.

Fig. 8 is a section taken on the line 8—8 of Fig. 7.

Figure 3:
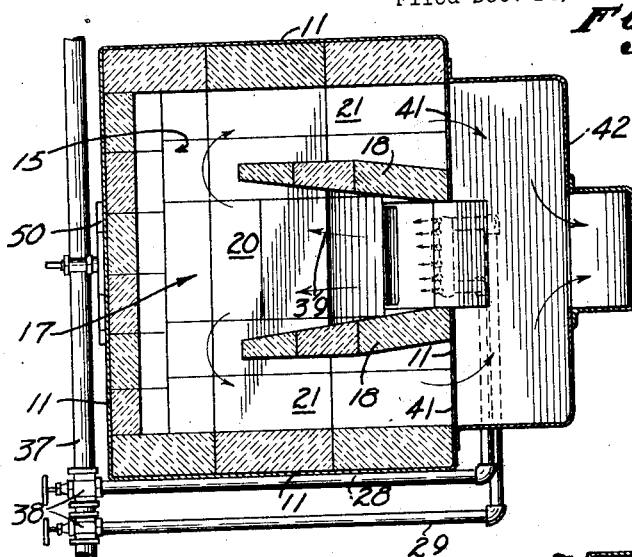
Fig. 3 is a horizontal section taken on the line 3—3 of Fig. 1.

Referring in detail to the drawings the range is composed of four vertical walls 11 and a bottom wall 12, this structure being supported on legs 13. Formed across the range near the upper end thereof is a partition 15 which is formed of fire-brick as shown. Supported at the top of the vertical walls 11 is a cook-plate 16, and provided between the partition 15 and the cook-plate 16 is a heat chamber 17. Referring to Fig. 3 the heat chamber 17 has baffles 18 extended from the back end towards the front end thereof which divide the heat chamber 17 into a central channel 20 and outer channels 21. The central and outer channels 20 and 21 are connected together at the front of the range because the baffles 18 terminate a distance in back of the front vertical wall 11. Formed at the back part of the central channel 20 is a combustion chamber 23 and situated at the back end of the combustion chamber 23 is a burner 24.

Figure 7:
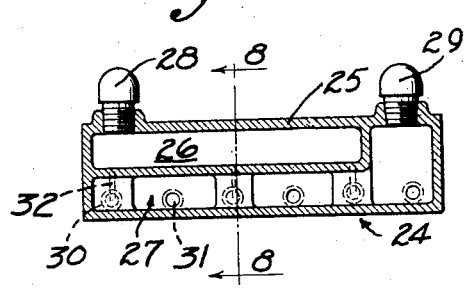
Fig. 7 is a section taken on the line 7—7 of Fig. 6.
Figure 6:
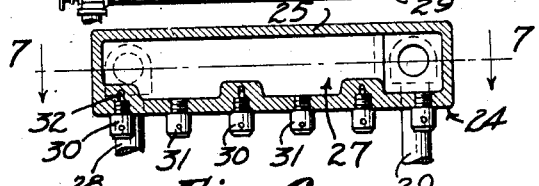
Fig. 6 is a fragmentary section taken on the line 6—6 of Fig. 2.

The burner 24 is illustrated in detail in Figs. 6, 7 and 8. It includes a body 25 having fuel chambers 26 and 27 to which fuel supply pipes 28 and 29 are connected. Screwed into a lower wall of the body 25 are nozzles 30 and 31. The nozzles 30 are connected by passages 32 to the chamber 26, whereas the nozzles 31 are connected directly to the chamber 27. The nozzles 30 and 31 project into a passage 35 which is communicated to the combustion chamber 23 and to the exterior of the range by means of a shell 36. The fuel supply pipes 28 and 29 are extended around one side of the range and are connected to main pipes 37, there being control valves 38 for controlling passage of fuel through the fuel pipes 28 and 29.

The burner when first lighted has all of the nozzles 30 and 31 supplying fuel to the passage 35, this being accomplished by opening both valves 38 for supplying fuel to both chambers 26 and 27. The fuel is ignited in the combustion chamber and the products of combustion which are very hot pass forward as indicated by arrows 39 in Fig. 3. The products of combustion or the hot gas pass around the forward ends of the baffles 18 and rearward through the outer channels 21 as shown. After the cook-plate 16 has become heated, one of the valves 38 may be closed so that only every alternate nozzle is supplying fuel for the burner. The back end of the outer channels is connected by openings 41 to a vent 42, by means of which the hot gas is disposed of. The placing of the burner at the rear part of the range and directing the hot gas forward through a central channel and rearward through outer channels is an important part of the invention.

Figure 5:
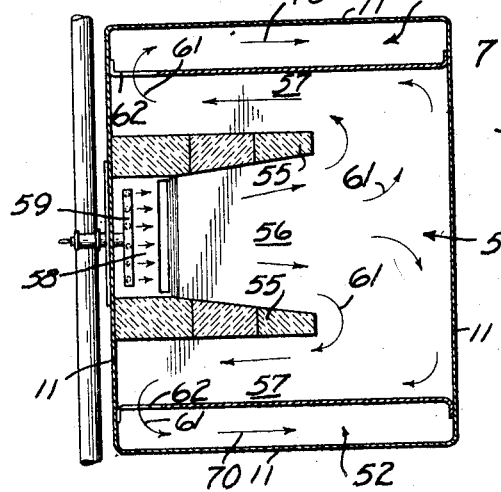
Fig. 5 is a horizontal section taken on the line 5—5 of Fig. 1.

In the lower part of the range is an oven 45 composed of side walls 46, an upper wall 47, and a bottom brick-insulated wall 48. The back of the oven 45 is formed of a part of one of the vertical walls 11, and the front end is closed by an oven door 50. Formed below the bottom wall 48 is a lower heat chamber 51, formed at the sides are side heat chambers 52, and formed at the top is an upper heat chamber 53. Referring particularly to Fig. 5 the lower heat chamber 51 is provided with baffles 55 which extend rearward from the front end thereof so as to divide it into a central channel 56 and outer channels 57 which are connected together at the rear part of the range. A combustion chamber 58 is formed at the forward part of the central channel 56 and a burner 59 is located at the front part of the combustion chamber 58 for supplying fuel. The hot gas produced by the burner 59 passes as indicated by arrows 61 in Fig. 5, this hot gas passing rearward through the central channel 56 and forward through the outer channels 57. The front ends of the outer channels 57 are connected by openings 62 to the front lower parts of the side heat chambers 52.

Figure 4:
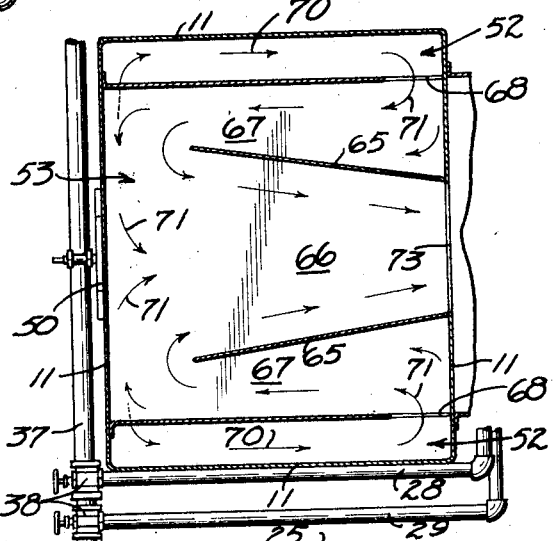
Fig. 4 is a horizontal section taken on the line 4—4 of Fig. 1.

Referring particularly to Fig. 4 the upper heat chamber 53 is provided with baffles 65 which extend from the rear part of this chamber towards the front part thereof so as to divide it into a central channel 66 and outer channels 67, these channels being connected together at the forward end of the range. The baffles 65 diverge towards the front end of the range as shown. The upper rear parts of the side heat chambers 52 are connected to the rear parts of the outer channels 67 by openings 68.

The hot gas passes into the lower forward parts of the side heat chambers through the openings 62 as indicated by arrows 70 in Figs. 2, 4 and 5 and passes from the upper rear parts through the openings 68 into the back parts of the outer channels 67 of the upper heat chamber 53. This hot gas passes through the upper heat chamber 53 as indicated by arrows 71 in Fig. 4, passing forward through the outer channels 67 and rearward through the central channel 66. The back end of the central channel 66 is provided with an opening 73 which connects to the vent 42 so that the hot gas may be disposed of.

The feature of this portion of the invention is that there is a very even distribution of heat. The hot gas by reason of the design of the invention is caused to move into all spaces formed below, above, and at the sides of the oven 45. The dividing of the lower and upper heat chambers into channels is important to the invention and the introducing of the hot gas at the forward lower part of the side heat chambers and drawing it from the upper back part is important to the invention.

The range of my invention is very economical. After it has once been heated, the fuel consumption is very low, and may be operated on less than one cubic foot of gas every forty-five seconds.

The feature of dividing the burner 24 so that one series of nozzles may be shut down assists in the ease with which the heat magnitude may be controlled.

I claim as my invention:

1. In a range, the combination of: walls forming a cooking chamber; walls forming a lower heat chamber below said cooking chamber, side heat chambers at the sides of said cooking chamber, and an upper heat chamber above said cooking chamber; lower baffles dividing said lower heat chamber into a central channel and outer channels connected to one end of said central channel, said outer channels being connected to the lower parts of said side heat chambers; a burner in said central channel of said lower heat chamber; upper baffles dividing said upper heat chamber into a central channel and side channels connected together, said side channels of said upper heat chamber being connected to said side heat chambers; and a vent connected to said central channel of said upper heat chamber.

2. In a range, the combination of: walls forming a cooking chamber; walls forming a lower heat chamber below said cooking chamber, side heat chambers at the sides of said cooking chamber, and an upper heat chamber above said cooking chamber; lower baffles dividing said lower heat chamber into a central channel and outer channels connected together, each of said outer channels being connected to one lower end of one of said side heat chambers; a burner in said central channel of said lower heat chamber; upper baffles dividing said upper heat chamber into a central channel and side channels connected together, each of said side channels of said upper heat chamber being connected to an opposite upper end of one of said side heat chambers; and a vent connected to said central channel of said upper heat chamber.

3. In a range, the combination of: walls forming a cooking chamber; walls forming a lower heat chamber below said cooking chamber, side heat chambers at the sides of said cooking chamber, and an upper heat chamber above said cooking chamber; lower baffles dividing said lower heat chamber into a central channel and outer channels connected together, said outer channels being connected to the lower parts of said side heat chambers at ends of said side heat chambers opposite from the ends where said central and outer channels of said lower heat chamber are joined together; a burner in said central channel of said lower heat chamber; upper baffles dividing said upper heat chamber into a central channel and side channels connected together, said side channels of said upper heat chamber being connected to said side heat chambers; and a vent connected to said central channel of said upper heat chamber.

4. In a range, the combination of: walls forming a cooking chamber; walls forming a lower heat chamber below said cooking chamber, side heat chambers at the sides of said cooking chamber, and an upper heat chamber above said cooking chamber; lower baffles dividing said lower heat chamber into a central channel and outer channels connected together, said outer channels being connected to the lower parts of said side heat chambers at ends of said side heat chambers opposite from the ends where said central and outer channels of said lower heat chamber are joined together; a burner in said central channel of said lower heat chamber; upper baffles dividing said upper heat chamber into a central channel and side channels connected together, said side channels of said upper heat chamber being connected to said side heat chambers at the upper parts thereof and at the ends opposite from the ends to which said outer channels of said lower heat chamber connect; and a vent connected to said central channel of said upper heat chamber.

5. In a range, the combination of: walls forming a cooking chamber; walls forming a lower heat chamber below said cooking chamber, side heat chambers at the sides of said cooking chamber, and an upper heat chamber above said cooking chamber; lower baffles dividing said lower heat chamber into a central channel and outer channels connected together, said outer channels being connected to the lower parts of said side heat chambers; a burner in said central channel of said lower heat chamber; upper baffles dividing said upper heat chamber into a central channel and side channels connected together, each of said side channels of said upper heat chamber being connected at one end to the central channel of said upper heat chamber and at its opposite end to one of said side heat chambers; and a vent connected to said central channel of said upper heat chamber.

6. In a range, the combination of: walls forming a cooking chamber; walls forming a lower heat chamber below said cooking chamber, side heat chambers at the sides of said cooking chamber, and an upper heat chambe above said cooking chamber; lower baffles dividing said lower heat chamber into a central channel and outer channels connected together, said outer channels being connected to the lower parts of said side heat chambers at ends of said side heat chambers opposite from the ends where said central and outer channels of said lower heat chamber are joined together; a burner in said central channel of said lower heat chamber; upper baffles dividing said upper heat chamber into a central channel and side channels connected together, said side channels of said upper heat chamber being connected to said side heat chambers at ends of said side heat chambers opposite from the ends adjacent to where the central and side channels of said upper heat chamber are joined together; and a vent connected to said central channel of said upper heat chamber.

7. In a range, the combination of: walls forming a cooking chamber; walls forming a lower seat chamber below said cooking chamber, side heat chambers at the sides of said cooking chamber, and an upper heat chamber above said cooking chamber; lower baffles dividing said lower heat chamber into a central channel and outer channels connected together, said outer channels being connected to the lower parts of said side heat chambers at ends of said side heat chambers opposite from the ends where said central and outer channels of said lower heat chamber are joined together; a burner in said central channel of said lower heat chamber; upper baffles dividing said upper heat chamber into a central channel and side channels connected together, said side channels of said upper heat chamber being connected to said side heat chambers at ends of said side heat chambers opposite from the ends adjacent to where the central and side channels of said upper heat chamber are joined together and being connected at the upper parts thereof and at the ends opposite from the ends to which said outer channels of said lower heat chamber connect; and a vent connected to said central channel of said upper heat chamber.

8. A combination as defined in claim 1 in which said burner is placed at one end of said central channel of said lower heat chamber opposite from the end which connects to the outer channels of said lower heat chamber.

9. A combination as defined in claim 1 in which said vent is connected to the end of said central channel of said upper heat chamber opposite from the said one end connected to said side channels of said upper heat chamber.

In testimony whereof, I have hereunto set my hand at Los Angeles, California, this 9th day of December, 1926.

PETER MADSEN.